United States Patent [19]

Matsuhisa

[11] Patent Number: 5,451,111
[45] Date of Patent: Sep. 19, 1995

[54] METHOD OF AND APPARATUS FOR AUTOMATICALLY OUTPUTTING THE IMAGE OF A PAGE

[75] Inventor: Takeshi Matsuhisa, Kyoto, Japan

[73] Assignee: Dainippon Screen Mfg. Co., Ltd., Japan

[21] Appl. No.: 164,035

[22] Filed: Dec. 8, 1993

[30] Foreign Application Priority Data

Dec. 14, 1992 [JP] Japan .................. 4-354122

[51] Int. Cl.$^6$ ........................... B41J 5/40
[52] U.S. Cl. ............................ 400/76; 360/79
[58] Field of Search ........... 395/117; 400/61, 62, 400/70, 76; 360/79

[56] References Cited

U.S. PATENT DOCUMENTS 5,179,649 1/1993 Masuzaki ............ 395/117

FOREIGN PATENT DOCUMENTS 0479494 9/1991 European Pat. Off. ........ 400/76

OTHER PUBLICATIONS

Computer Design, vol. 27, No. 13, Jul. 1988, Littleton, Mass. US, pp. 26–30, Printer Controller ICS Take on PDL Bottleneck.

*Primary Examiner*—David A. Wiecking
*Assistant Examiner*—Steven S. Kelley
*Attorney, Agent, or Firm*—Ostrolenk, Faber, Gerb & Soffen

[57] ABSTRACT

A storage media (magneto-optical disc, for example) stores material data of a page, layout data of the page and an output control file having a preset name. The output control file contains designating data describing the location of the material data and the location of the layout data in the storage media. When the storage media is detected being set in the media drive, the output control file with the preset name is searched. When the output control file is found, the designating data is read out, and the material data and the layout data are retrieved from the storage media using the designating data. Based on the material data and the layout data, the image of the page is outputted onto a sheet.

12 Claims, 7 Drawing Sheets

METHOD OF AND APPARATUS FOR AUTOMATICALLY OUTPUTTING THE IMAGE OF A PAGE

The present invention relates to a method of and apparatus for automatically outputting the image of a page which can be used for producing a printing plate.

BACKGROUND OF THE INVENTION

When a layout editing of a page is finished, a page geometry file as well as one or several material files are created and stored in a storage media (e.g., a magneto-optical disc). The material files contain data of the material constituting the page such as letters, lines and pictures. The material files include one or more line work files (hereinafter referred to as LW files) containing vector data of letters, lines, etc., and one or more continuous tone files (hereinafter referred to as CT files) containing pixel data (or bit map data) of pictures, photographs, etc. A page geometry file (hereinafter referred to as a PG file) contains data of the layout of the elements in the page.

A conventional system for outputting the image of a page on a reproduction film (from which a printing plate is produced) from a storage media storing material files and a geometry file is described with reference to FIG. 7. The system of FIG. 7 includes a magneto-optical disc drive (MOD drive) 54, a layout station 55, a graphic station 53, an output station 56, a recorder 51, a data processing station 57, a disc controller 58 and a disk unit 59. The disk unit 59 may include several physically separate storage disks (e.g., hard disks) as shown in FIG. 7. When an operator receives a magneto-optical disc (MO disc or MOD) 52 storing LW files, CT files and a PG file, he or she sets the MO disc 52 in the MOD drive 54. The operator operates a terminal of the MOD drive 54 to read those files (LW files, CT files, and a PG file) stored in the MO disc 52 and stores the files in the disk unit 59 via the disk controller 58. When all the necessary files are read out, the MO disc 52 can be removed from the MOD drive 54.

Next the operator operates a terminal of the layout station 55 or of the output station 56 to transfer the LW files and the PG file in the disk unit 59 to the graphic station 53. Then the operator operates a terminal of the graphic station 53 to generate a JOB file, an MSK file and, when special LW data is contained in the PG file, a special LW file from the PG file. The special LW file generated from the PG file is hereinafter referred to as LW2 file to distinguish it from the LW files stored by themselves in the MO disc 52. The JOB file contains data describing the process of outputting the image of a page, and is referred to in the later-described output process using the output station 56. The MSK file contains data of a mask or masks which defines the output area of a picture or pictures in the page. These files (the JOB file, the MSK file, and the LW2 file) generated from the PG file are also stored in the disk unit 59 through the disk controller 58.

Then the operator operates a terminal of the data processing station 57 to command the disk controller 58 to connect the disk unit 59 (which now stores the PG file, the CT files, the LW files, the JOB file, the MSK file and the LW2 file) to the data processing station 57. After the disk unit 59 is connected first, the PG file is read out from the disk unit 59, and the LW files and the LW2 file are combined to create a final base page LW file according to the description in the PG file. Then the JOB file is read out from the disk unit 59 and a final base page LW file is created from the CT file and the MSK file according to the data in the JOB file. The final base page LW file and the final base page CT file are stored in the disk unit 59.

The operator then operates a terminal of the output station 56 to transfer the final base LW page file stored in the disk unit 59 to the graphic station 53, and to connect the disk unit 59 that stores the final base page CT file to the output station 56. The operator gives output conditions (e.g., screen line-frequency, screen angle, etc.) to the recorder 51 through the terminal of the output station 56, and designates the final base page LW file and the final base page CT file, whereby the data in the final base page LW file stored in the graphic station 53 and the data in the final base page CT file stored in the disk unit 59 are combined and outputted on a film at the recorder 51.

The above description shows that, even after the editing operation is finished and all the material data and the layout data are stored in an MO disc 52, the operator still has to operate many terminals and give various complicated commands to the terminals. When different operators operate those terminals, a scrupulous arrangement is necessary beforehand.

SUMMARY OF THE INVENTION

An object of the present invention is therefore to provide a method of and an apparatus for automatically outputting the image of a page by simply inserting the storage media containing necessary data in the media drive.

According to the present invention, a method of automatically outputting the image of a page comprises the steps of:

storing material data representing the material constituting the page into a storage media;

storing layout data representing the layout of the material in the page into the storage media;

storing an output control file into the storage media with a preset name, the output control file containing designating data representing the location of the material data and the location of the layout data in the storage media;

searching the storage media for the output control file having the preset name when the storage media is set in a media drive;

retrieving the material data and the layout data from the storage media referring to the designating data in the output control file;

processing the material data and the layout data for generating image data representing the image of the page; and outputting the image of the page on a sheet based on the image data.

An image output apparatus according to the present invention for automatically outputting the image of a page is used with a suitably prepared storage media. The storage media stores material data, layout data and an output control file which has a preset name. The material data represents the material constituting the page, the layout data represents the layout of the material in the page, and the output control file contains designating data representing the location of the material data and the location of the layout data in the storage media. The image output apparatus of the present invention comprises:

a media drive for retrieving data from the storage media;

a media detector for detecting that the storage media is set in the media drive;

file searching means for searching the storage media for the output control file having the preset name when the media detector detects that the storage media is set in the media drive;

data retrieving means for retrieving the material data and the layout data from the data storage media using the designating data in the output control file;

image data generating means for generating image data representing the image of the page based on the material data and the layout data; and a recorder for outputting the image of the page on a sheet based on the image data.

When the storage media is detected in the media drive, the output control file having the preset name is searched in the storage media. When the output control file is found, the designating data is read out from the output control file, and the material data and the layout data are retrieved from the storage media using the designating data. The image data representing the image of the page is generated from the material data and the layout data, and the image data is outputted onto a sheet. Thus, the image of the page is automatically outputted by simply setting the storage media into the media drive.

Details and other features of the present invention are described in the following description of the preferred embodiments.

DETAILED DESCRIPTION OF PREFERRED EMBODIMENTS

Figure 1:
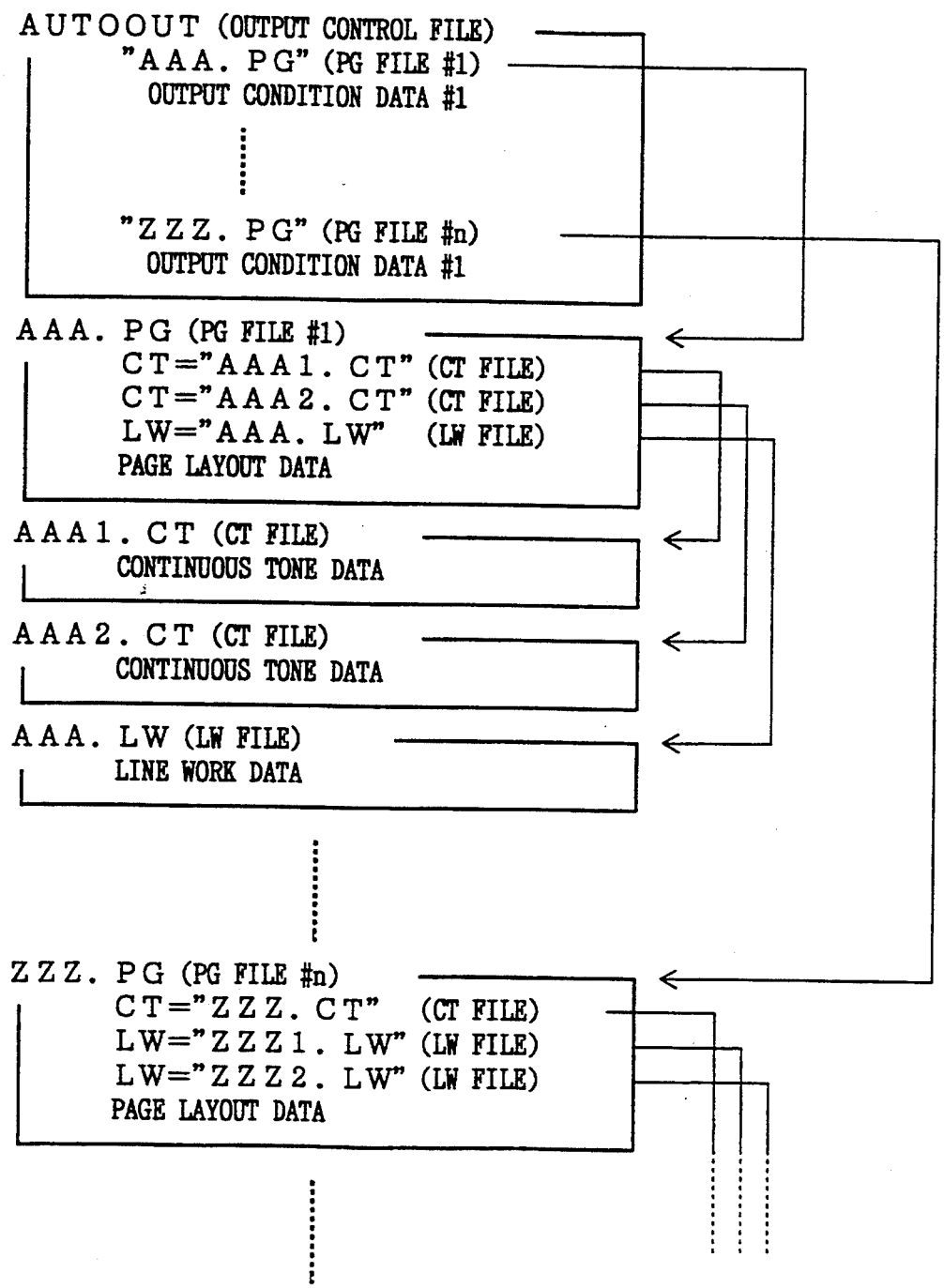
FIG. 1 is a schematic diagram explaining the relationship of files contained in an MO disc according to the image output device as the first embodiment of the present invention.
Figure 2:
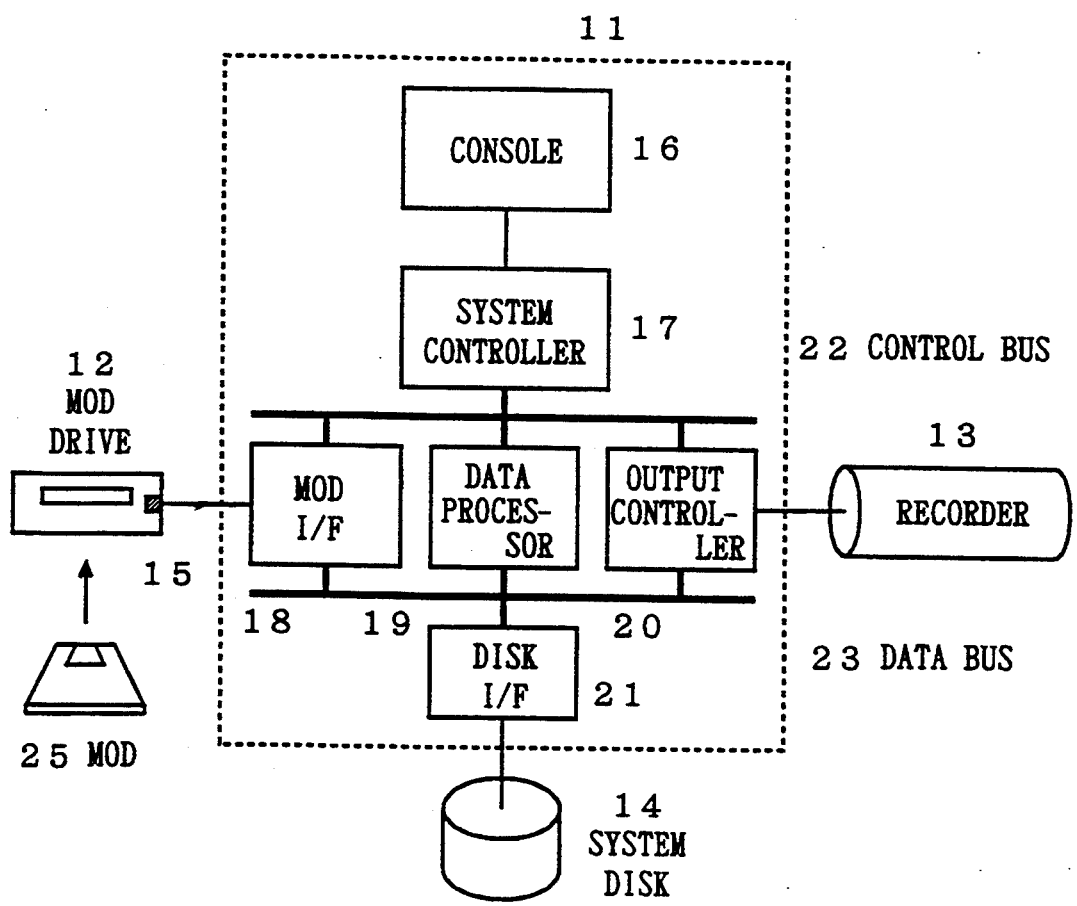
FIG. 2 is a block diagram showing the structure of the image output device of the first embodiment.

The first embodiment of the present invention is described referring to FIG. 1 through FIG. 4. As shown in FIG. 2, an image output device of the present embodiment includes a main section 11, an MOD (magneto-optical disc) drive 12, a recorder 13 and a system disk unit 14. A general MOD drive can read data from and write data to an MO disc 25, but, in this embodiment, it is possible to use an MOD reader which cannot write data on the MO disc 25. The MOD drive 12 is equipped with an MOD detector 15 (the media detector) which detects that an MO disc 25 is set in the MOD drive 12. The recorder 13 outputs an image onto a film according to image data supplied from the later-described output controller 20 of main section 11. In outputting the data onto the film of recorder 13, some output conditions (such as screen line-frequency, screen angle, etc.) must be specified at the recorder 13. The output conditions of the recorder 13 of the present embodiment can be set by sending external command signals to the recorder 13. The system disk unit 14 may include one or several hard disk units, or a non-volatile semiconductor memory unit can be used instead of the hard disk.

The main section 11 includes an interface 18 for the MOD drive 12, a calculation unit 19, output controller 20 and another interface 21 for the system disk unit 14, all of which are interconnected with a data bus 23 for transmitting material data and layout data. The MOD interface 18 converts the format of data read out from an MO disc 25 to another format adapted to the main section 11. The signal from the MOD detector 15 is sent to the later-described system controller 17 via the MOD interface 18. The calculation unit 19 processes the material data and the layout data read out from the MO disc 25 and generates data of a final base page. Based on the data of the final base page, the output controller 20 generates data (image data) adapted to the recorder 13.

The main section 11 further includes a system controller 17 and a console 16 which consists of a keyboard and a display. The MOD interface 18, the calculation unit 19 and the output controller 20 are connected to the system controller 17 with a control bus 22 for transmitting command signals. The system controller 17, including a CPU, a ROM, a RAM, etc., executes programs stored in the ROM [or loaded from an external storage device (not shown) to the RAM] to output the image of a page onto a film automatically. That is, when an MO disc 25 containing necessary data in predetermined manners is set in the MOD drive 12, the image output device of the present embodiment automatically performs a series of operations to output the image of a page on a film without any operation by an operator.

The necessary data and the predetermined manners of storage in an MO disc 25 for an automatic image outputting are explained referring to FIG. 1. First, all the material data of the page to be outputted must be stored in the MO disc 25. The material data includes vector data (LW data) representing letters, lines, etc. and pixel data (CT data) representing photographs, etc. The LW data is contained in a LW file or in plural LW files, and the CT data is contained in a CT file or in plural CT files. In FIG. 1, the name of the LW file is given an extension of ".LW" (as "AAA.LW") and the names of the CT files are given an extension of ".CT" (as "AAA1.CT" and "AAA2.CT").

Next, the layout data representing the layout of the material (letters, lines, photographs, etc.) in the page must be stored in the MO disc 25. The layout data is contained in a PG file whose name is given an extension of ".PG" (as "AAA.PG" and "ZZZ.PG" in FIG. 1). A page (which corresponds to a piece of film in this case) to be outputted requires one PG file, and an MO disc 25 can store plural PG files to output plural pages. Besides the layout data, the PG file contains the names of the LW files and CT files of the material data constituting the page. The PG file may further contain vector data representing lines and linear drawings.

The MO disc 25 used in the image output device of the present embodiment for the automatic image outputting must store an output control file having a predetermined name, e.g., "AUTOOUT" in FIG. 1. The output control file contains the name or names of the PG file or files corresponding to the page or pages to be outputted on a film or films. The output control file may further contain data of the output conditions of the recorder 13 (e.g., line-frequency and angle of the screen used to output the CT data on the film). When the output control file does not contain the data of the output conditions, the conditions previously set at the recorder 13 are used or preset standard (default) conditions are used. The data of the output conditions can be contained in a separate file (output condition file), in which case the output control file contains the name of the output condition file.

Figure 3:
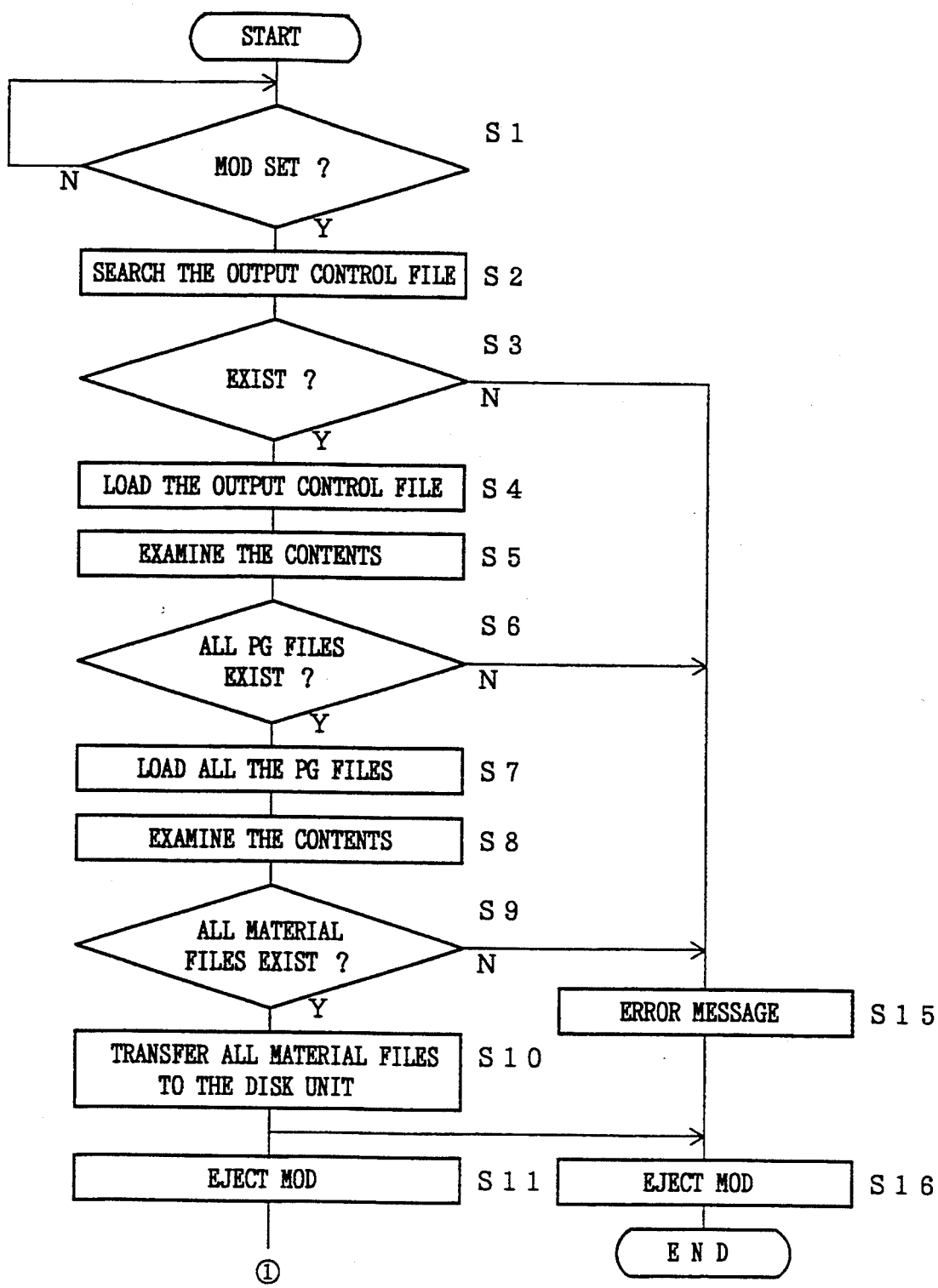
FIG. 3 is the first half of the flowchart of an automatic image output routine of the image output device of FIG. 2.
Figure 4:
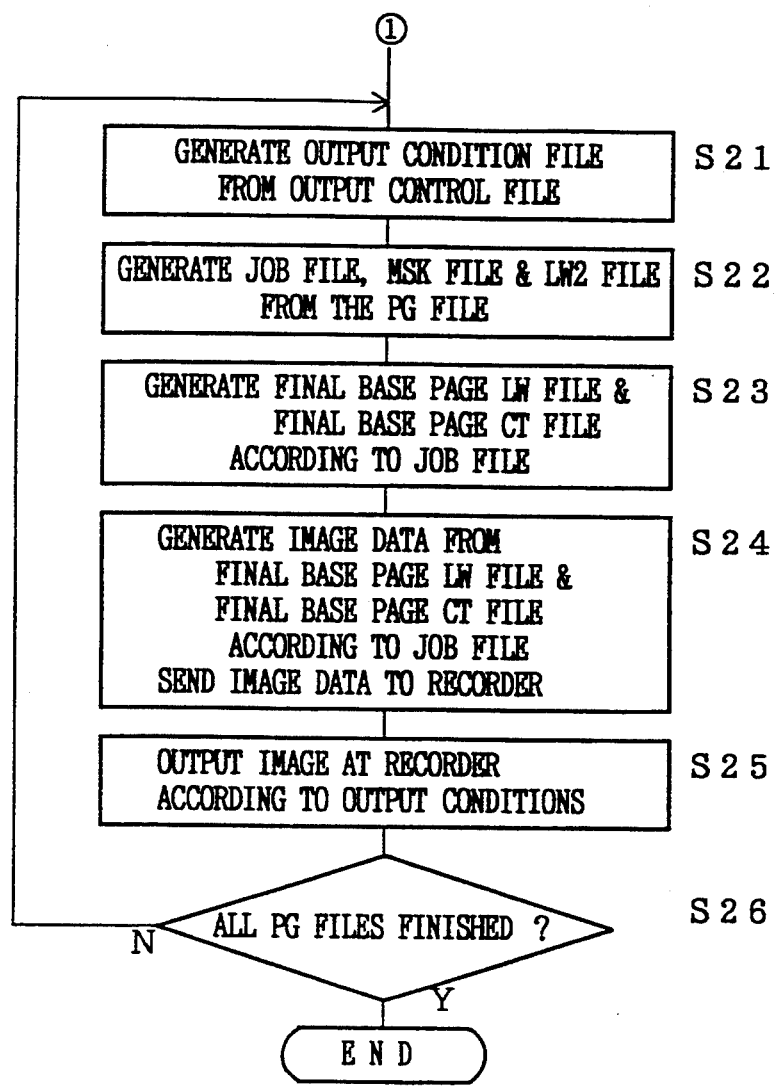
FIG. 4 is the latter half of the flowchart of the automatic image output routine of the image output device of FIG. 2.

The routine executed by the system controller 17 for an automatic image outputting is described referring to FIGS. 3 and 4. When the routine starts, the system controller 17 waits until an MO disc 25 is set in the MOD drive 12 (step S1). When a signal comes from the MOD detector 15 via the MOD interface 18 informing that an MO disc 25 is set, the process proceeds to step S2, where the predetermined directory area of the MO disc 25 is searched. There it is judged at step S3 whether the predetermined name of the output control file ("AUTOOUT" in this case) exists in the directory area. When the predetermined file name is not found in the directory area of the MO disc 25, the process proceeds to step S15, where a preset error message is presented on the display of the console 16 and the MO disc 25 is ejected from the MOD drive 12 (step S16).

When the predetermined file name is found in the directory area of the MO disc 25, the output control file "AUTOOUT" is loaded from the MO disc 25 to the internal memory (RAM in the system controller 17) or to the system disk unit 14 at step S4, and the contents of the file "AUTOOUT" are examined at step S5. As described above, the output control file "AUTOOUT" contains one or plural PG file names (n file names from "AAA.PG" to "ZZZ.PG" in the case of FIG. 1). The system controller 17 judges at step S6 whether all the PG files "AAA.PG" to "ZZZ.PG" whose file names are described in the output control file exist in the MO disc 25. When any of the PG files described in the output control file is missing in the MO disc 25, the process proceeds to steps S15 and S16 to present an appropriate error message and to eject the MO disc 25.

When all the PG files "AAA.PG" to "ZZZ.PG" are confirmed to exist in the MO disc 25, all the PG files "AAA.PG" to "ZZZ.PG" are loaded from the MO disc 25 to the internal memory or to the system disk unit 14 at step S7, and the contents of every PG file are examined at step S8. Since, as described above, every PG file contains the names of the material files (i.e., LW files and CT files) constituting the page, the system controller 17 then judges at step S9 whether all the material files ("AAA1.CT", "AAA2.CT", "AAA.LW", . . . , "ZZZ.CT", "ZZZ1.LW", "ZZZ2.LW" in the case of FIG. 1 ) exist in the MO disc 25 referring to the directory area. When, similarly to the steps S3 and S6, any of the material files is missing in the MO disc 25, the process proceeds to steps S15 and S16 to present an appropriate error message and eject the MO disc 25.

When all the material files ("AAA1.CT", "AAA2.CT", "AAA.LW", "ZZZ.CT", "ZZZ1.LW", "ZZZ2.LW") are confirmed to exist in the MO disc 25, all the material files are transferred from the MO disc 25 to the system disk unit 14 at step S10. After all the material files are read out from the MO disc 25, the MO disc 25 is ejected from the MOD drive 12 at step S11.

This enables the MOD drive 12 to accept another MO disc 25, and another set of a PG file and material files can be retrieved from the MO disc 25 and stored in the system disk unit 14 by executing steps S1 through S16 while the following steps S21 through S25 (FIG. 4) are executed in parallel.

When all the necessary data is confirmed and transferred to the system disk unit 14, the process proceeds to step S21 of FIG. 4 to start outputting the first page. At step S21, the output conditions of the recorder 13 for the first page is read out from the output control file and an output condition file is created containing the data of the output conditions. Then a JOB file, an MSK file, and (if applicable) an LW2 file are created from the PG file corresponding to the first page (step S22). The LW2 file is combined with the LW files designated by the PG file to create a final base page LW file (step S23). The MSK file is used to create a final base page CT file with the CT files designated by the JOB file (step S23).

The output controller 20 reads the output condition file and sets the recorder 13 according to the data contained therein. Then the output controller 20 retrieves LW data from the final base page LW file and CT data from the final base page CT file both stored in the system disk unit 14, and combines the LW data and the CT data to create data (image data) representing the image of the page. The image data is sent from the output controller 20 to the recorder 13, where the image data is outputted onto a film according to the output conditions (step S24). When the output control file does not include data of the output conditions, previously set (through the console 16 or directly on the recorder 13) output conditions (the default output conditions) are used. Thus, a reproduction film (i.e., ready to be used in producing a printing plate) of the first page is produced by the recorder 13.

When the outputting of the first page is thus finished, it is then judged at step S25 whether all the PG files (n files in this case) have been processed. When any of the PG files remain unprocessed, the process returns to step S21 to repeat the above described automatic image outputting process. When all the PG files designated by the output control file "AUTOOUT" are finished, the present program ends.

In the above embodiment, the file name of the PG file stored in the output control file corresponds to the designating data, because the location of PG file can be determined by referring to the directory area of the MO disk with the name of the PG file, and the location of the LW files and CT files (the material files) can be determined by again referring to the directory area of the MO disc with their names.

Figure 5:
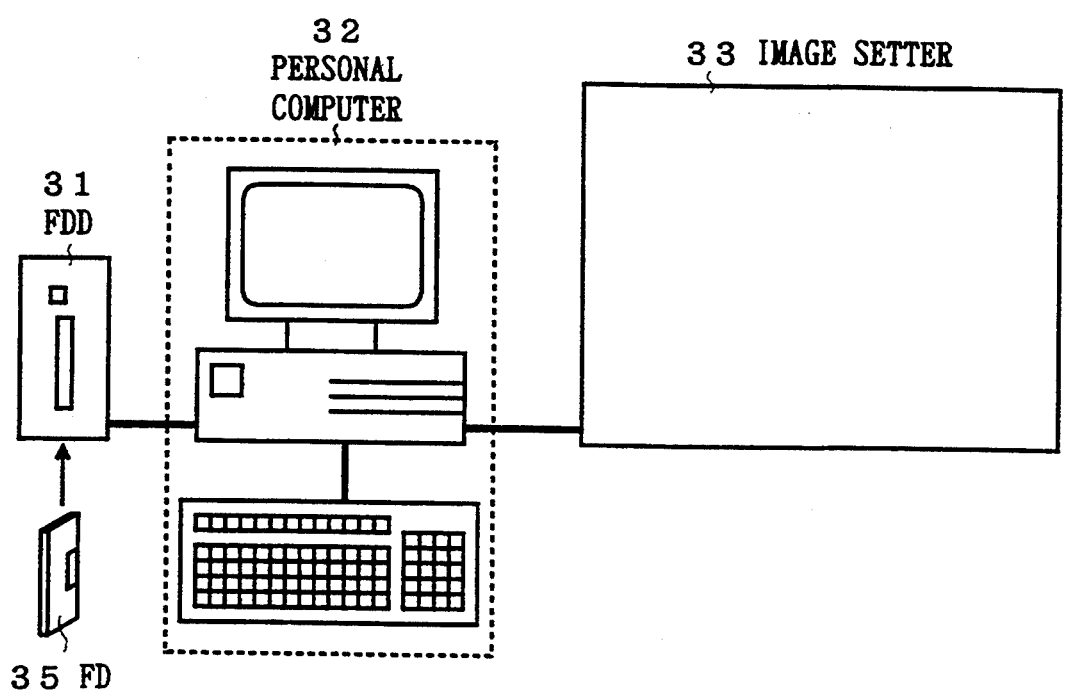
FIG. 5 is a structural diagram of a personal computer system embodying the present invention.

The second embodiment of the present invention is an automatic image output system using a general data processing device such as a personal computer or a work station. In the present embodiment, a personal computer that can handle a page description language (PDL) is used for outputting the image of a page. A page description language (PDL) is a computer language for describing an outputting format of data, and one of the well known page descriptive languages is the PostScript (trade name of Adobe Systems, Inc.). The system of the present embodiment includes, as shown in FIG. 5: a personal computer 32, a floppy disk drive (FDD) 31 and an image setter 33. The floppy disk drive (FDD) can be replaced by an MOD (magneto-optical disc) drive.

In this case, the layout data as well as the material data (including vector data and pixel data) of a page are both contained in a file (hereinafter it is referred to as a PDL file). When the system of the present embodiment is used to automatically output one or plural pages, PDL files corresponding to respective pages should be previously stored in a floppy disk (FD) 35 (or in an MO disc), and further an output control file having a preset name (e.g., "AUTOOUT") must be stored in the floppy disk (FD) 35. The output control file contains the data of the names of the PDL files and the data of the output conditions corresponding to the respective PDL files. As described above, it is possible to store the data of the output conditions in a separate file (output condition file) and to store the name of the output condition file in the output control file.

Figure 6:
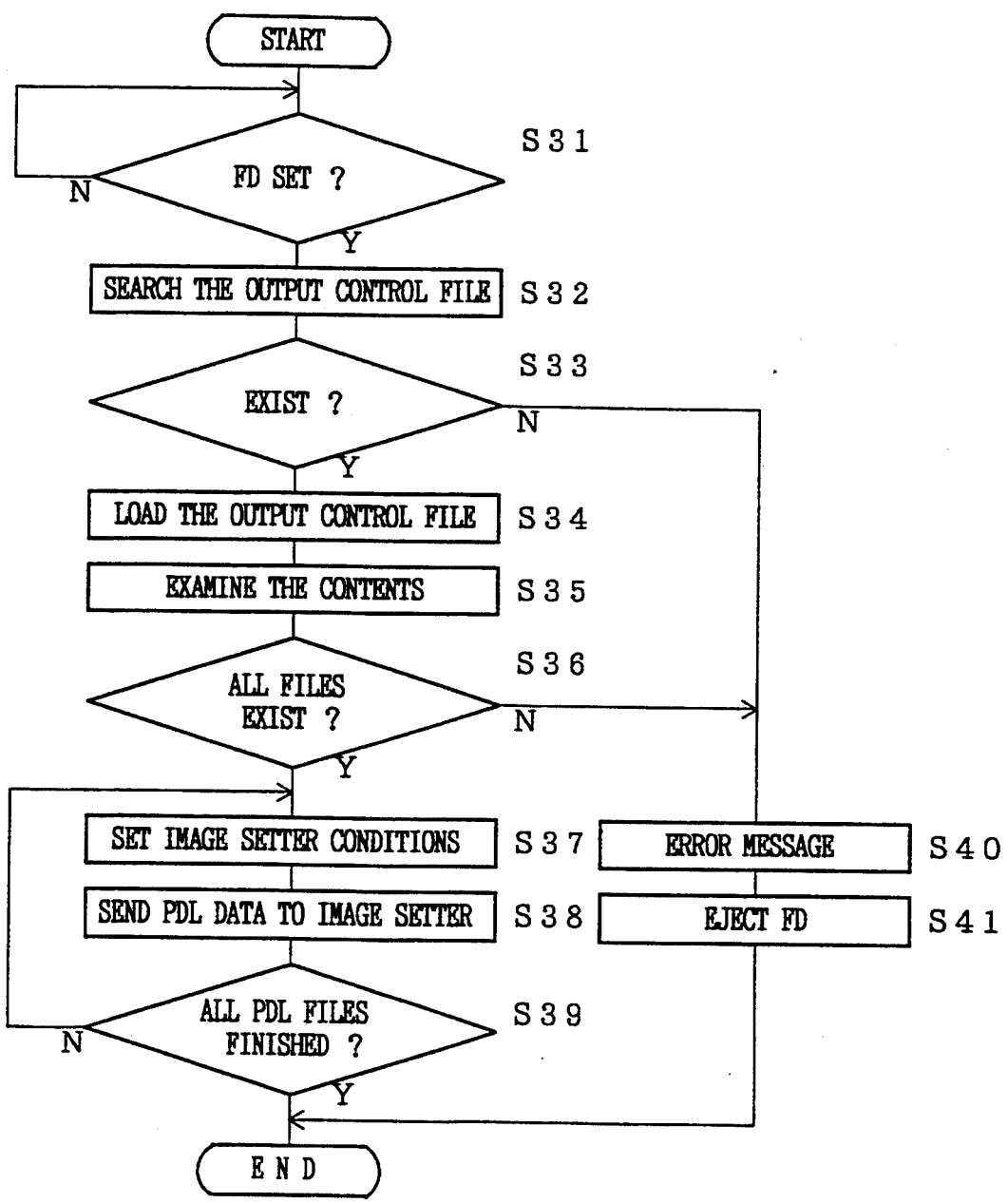
FIG. 6 is a flowchart of an automatic image output process executed by the personal computer system of FIG. 5.
Figure 7:
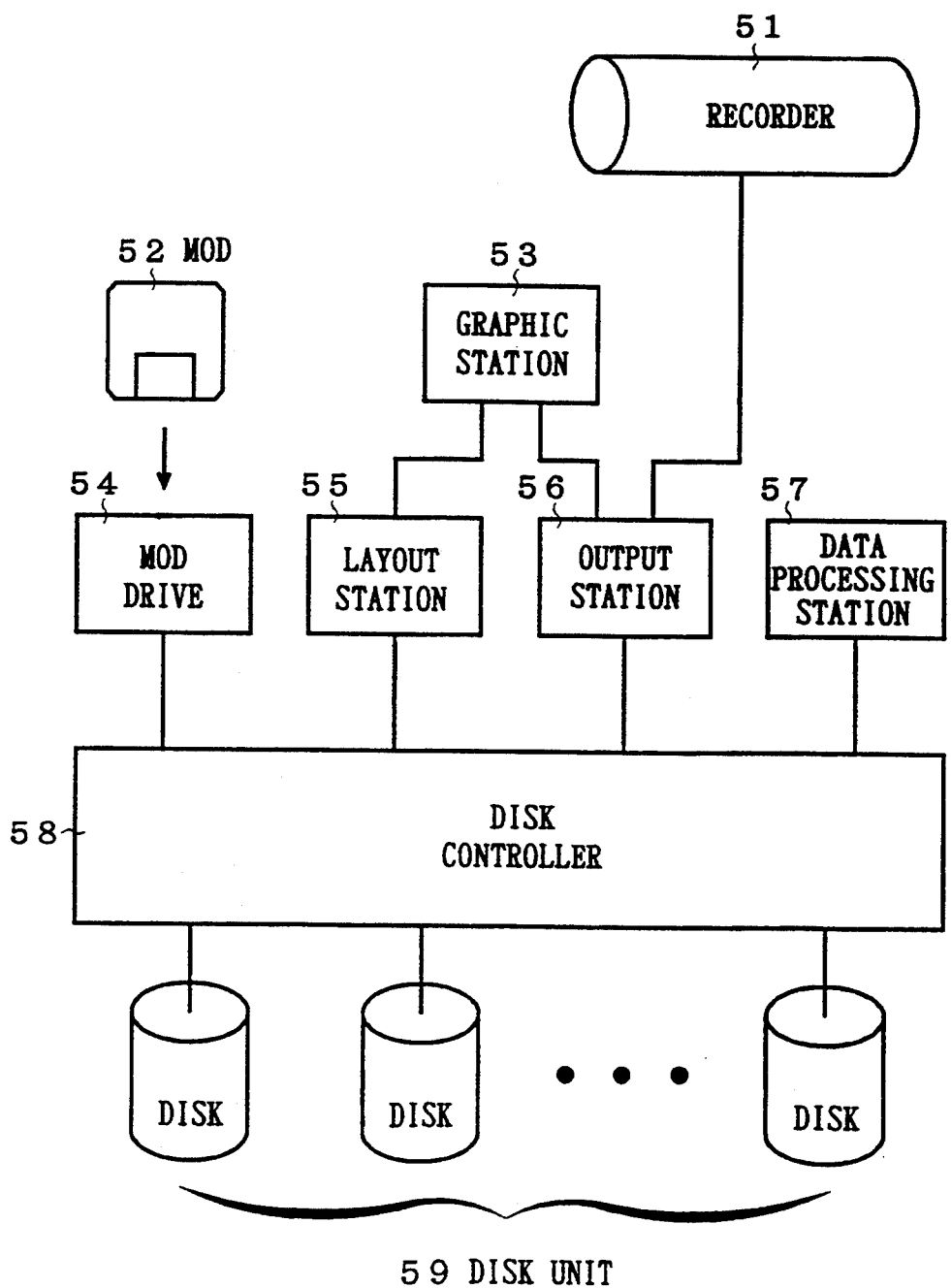
FIG. 7 is a structural diagram of a prior art image output system.

In the personal computer 32, the image output program as shown in FIG. 6 is executed. When the program starts, first, the personal computer 32 waits at step S31 for a floppy disk (FD) 35 to be inserted in the floppy disk drive (FDD) 31. When a floppy disk (FD) 35 is inserted, the directory area of the floppy disk (FD) 35 is searched at step S32 to find the preset name ("AUTOOUT") of the output control file. When the preset file name is not found at step S33, an appropriate error message is shown on a display of the personal computer 32 at step S40 and the floppy disk (FD) 35 is ejected from the floppy disk drive (FDD) 31. When the preset file name is found in the directory area, the output control file is read out from the floppy disk (FD) 35 at step S34. The contents of the output control file are examined at step S35 to get the name or names of the PDL files, and data of the output conditions (or alternatively the name of the file containing the data of the output conditions) of the image setter 33. Then it is judged at step S36 whether all the PDL files and (if the name of the output condition file is present in the output control file) the output condition file exist in the floppy disk (FD) 35. When any of those files is missing, an appropriate error message is shown on the display of the personal computer 32 and the floppy disk (FD) 35 is ejected from the floppy disk drive (FDD) 31 at steps S40 and S41. When all the PDL files and (if applicable) the output condition file are confirmed to exist in the floppy disk (FD) 35, the process proceeds to step S37.

At step S37, the image setter 33 is set at the output conditions (e.g., line frequency and angle of the screen, etc.) as described in the output control file or, if applicable, referring to the output condition file. It is possible at step S36 not to stop processing and to continue processing by adopting the output conditions predetermined by the system (default conditions) or preset to the image setter 33 when no output condition data exists in the output control file or output condition file is missing in the floppy disk (FD) 35. Then the first PDL file is read out from the floppy disk (FD) 35 at step S38 and the PDL program contained therein is sent to the image setter 33. The image setter 33 outputs the image of the page on a sheet of paper or on a film according to the PDL program describing the page. When the first PDL file is finished, it is judged at step S39 whether any PDL file remains unprocessed in the floppy disk (FD) 35. When there is another unprocessed PDL file in the floppy disk (FD) 35, steps S37 and S38 are repeated until all the PDL files are finished outputting.

In the second embodiment, it is possible to transfer necessary files or data to a high-speed storage unit (e.g. a hard disk unit or a semiconductor storage device) beforehand when all are confirmed to exist in the floppy disk (FD) 35, and by so doing save a lot of time in the image output step.

What is claimed is:

1. A method of outputting an image of a page comprising the steps of:

storing material data representing the material constituting the page into a storage media;

storing layout data representing the layout of the material in the page into the storage media;

storing an output control file having a preset name assigned thereto into the storage media with said preset name, the output control file containing designating data representing the location of the material data and the location of the layout data in the storage media;

running a computer program to perform automatically, without operator intervention, the steps of:

waiting for the storage media to be set in a media drive;

detecting that the storage media has been set in the media drive;

searching the storage media for the output control file having the preset name when the storage media is detected in the media drive;

retrieving the material data and the layout data from the storage media using the designating data in the output control file;

processing the material data and the layout data for generating image data representing the image of the page; and outputting the image of the page on a sheet based on the image data.

2. The automatic image output method according to claim 1, wherein:

the material data is contained in one or plural material data files and the layout data is contained in a layout data file; and the output control file contains the name or names of the material data file or files and the name of the layout data file as the designating data.

3. The automatic image output method according to claim 2, wherein:

the material data includes vector data and pixel data; and the vector data and the pixel data are contained in separate files.

4. The automatic image output method according to claim 2, wherein:

the retrieving step, the processing step, and the output step are repeated automatically for each of plural layout data files when names of plural layout data files are contained in the output control file.

5. The automatic image output method according to claim 1, wherein:

the material data and the layout data are contained in a PDL file using a page description language; and the output control file contains the name of the PDL file.

6. The automatic image output method according to claim 5, wherein:

the retrieving step, the processing step, and the outputting step are repeated automatically for each of plural PDL files when names of plural PDL files are contained in the output control file.

7. An image output apparatus for automatically outputting an image of a page when used with a storage media storing material data, layout data and an output control file having a preset name, where the material data represents material constituting the page, the layout data represents the layout of the material in the page, and the output control file contains designating data representing the location of the material data and the location of the layout data in the storage media, the image output apparatus being computer controlled and functioning automatically without operator intervention, the image output apparatus comprising:

a media drive for retrieving data from the storage media;

means for waiting for the storage media to be manually set in the media drive by an operator;

a media detector for detecting that the storage media is set in the media drive;

file searching means for searching the storage media for the output control file having the preset name when the media detector detects that the storage media is set in the media drive;

data retrieving means for retrieving the material data and the layout data from the data storage media using the designating data in the output control file;

image data generating means for generating image data representing the image of the page based on the material data and the layout data; and a recorder for outputting the image of the page on a sheet based on the image data.

8. The image output apparatus according to claim 7, wherein:

the material data is contained in one or plural material data files and the layout data is contained in a layout data file; and the output control file contains the name or names of the material data file or files and the name of the layout data file as the designating data.

9. The image output apparatus according to claim 8, wherein:

the material data includes vector data and pixel data; and the vector data and the pixel data are contained in separate files.

10. The image output apparatus according to claim 8, wherein:

the image output apparatus further comprises repeating means for employing the data retrieving means and the image data generating means for each of plural layout data files when plural names of layout data files are contained in the output control file.

11. An image output apparatus for automatically outputting an image of a page when used with a storage media storing a PDL file and an output control file having a preset name, where the PDL file contains PDL data describing the image of the page using a page description language, and the output control file contains the name of a PDL file, the image output apparatus being computer controlled and functioning automatically without operator intervention, the image output apparatus comprising:

a recorder for outputting the image of the page on a sheet based on the PDL data;

a media drive for retrieving data from the storage media;

means for waiting for the storage media to be manually set in the media drive by an operator;

a media detector for detecting that the storage media is set in the media drive;

file searching means for searching the storage media for the output control file having the preset name when the media detector detects that the storage media is set in the media drive;

output means for retrieving the PDL data from the data storage media referring to the output control file and for sending the PDL data to the recorder.

12. The image output apparatus according to claim 11, wherein the image output apparatus further comprises repeating means for employing the output means for each of plural PDL files when plural names of PDL files are contained in the output control file.

* * * * *